May 6, 1958 F. W. ROBERTS ET AL 2,833,860

DICTATION SYSTEM

Filed April 10, 1956 4 Sheets-Sheet 1

INVENTORS
Frederick W. Roberts
Roger C. Curtis
Lloyd R. Jones
Rudolf E. Freund
BY
Curtis Morris & Safford
ATTORNEYS

DICTATION SYSTEM

Filed April 10, 1956

INVENTORS
Frederick W. Roberts
Roger C. Curtis
Lloyd R. Jones
Rudolf E. Freund
BY
Curtis, Morris & Safford
ATTORNEYS May 6, 1958 F. W. ROBERTS ET AL 2,833,860

DICTATION SYSTEM

Filed April 10, 1956 4 Sheets-Sheet 3

INVENTORS
Frederick W. Roberts
Roger C. Curtis
Lloyd R. Jones
Rudolf E. Freund
BY
Curtis Morris & Safford
ATTORNEYS INVENTORS
Frederick W. Roberts
Roger C. Curtis
Lloyd R. Jones
Rudolf E. Freund
BY
Curtis Morris & Safford
ATTORNEYS United States Patent Office 2,833,860

Patented May 6, 1958

2,833,860

DICTATION SYSTEM

Frederick W. Roberts, Fairfield, Roger C. Curtis, New Haven, and Lloyd R. Jones and Rudolf E. Freund, Bridgeport, Conn., assignors to Dictaphone Corporation, Bridgeport, Conn., a corporation of New York Application April 10, 1956, Serial No. 577,305

22 Claims. (Cl. 179—6)

This invention relates to dictation equipment. More particularly, this invention relates to dictation systems wherein any one of a number of remotely located dictating stations is connectible to centrally located recording apparatus. The dictation system disclosed herein is in certain respects similar to that disclosed in the copending application Serial No. 518,218, filed on June 27, 1955, by L. R. Jones and R. E. Freund. To simplify the the showing herein, many components are described only briefly where further information on such components is available in that copending application.

One of the problems in dictation systems using dial telephone desk-sets as remote dictating stations concerns the "playback" function. Typically, the dictator is enabled to play back a portion of the previously recorded material by dialing a number, e. g. the digit "6." Prior systems also have commonly been arranged so that, when the dictator wishes to resume dictation after playing back the desired material, he must again operate the dial to return the machine to its "record" condition, e. g. by dialing "1." However, the dictator sometimes will forget to return the recording equipment to its record condition before continuing his dictation, and the additional recorded material will be lost.

There also has been a problem in such dictation systems in providing suitable means for actuating the recording machine drive system whenever it is desired to dictate. Some of such systems heretofore have used the telephone dial for controlling this function, e. g. dialing "1" to actuate a clutch, and dialing "1" again to deactuate the clutch, but such a procedure is somewhat inconvenient for the dictator. Various other proposals also have been made, such as the use of a separate push-button on the telephone handset for controlling the clutch, but none of these has been a completely satisfactory solution to the problem for various reasons.

Accordingly, it is an object of the present invention to provide dictating apparatus that is superior to that available heretofore. It is a further object of this invention to provide improved means for controlling the recording machine drive system. It is a still further object of this invention to provide apparatus which is so arranged that the dictator will not proceed with dictation while the recording machine is in its "playback" condition.

In a preferred embodiment of the present invention, to be described hereinbelow in more detail, there is provided a remote dictation system having a voice-operated relay which is connected to the recording machine in such a manner that it "monitors" the speech signals picked up by the reproducing head during a playback operation. Upon cessation of these signals for any substantial length of time, this relay automatically switches the recording machine from playback condition to its normal condition where recording can be continued after actuation of the machine clutch. In this embodiment, the voice-operated relay also is used to monitor the speech signals produced by the telephone transmitter during recording and to actuate the machine clutch whenever such speed signals appear. The speech signals produced by the telephone transmitter are delayed by means of a rotating magnetic drum so that the machine drive system may achieve proper operating speed before these signals reach the recording head, in order to prevent clipping of the first syllable or word spoken into the telephone transmitter.

With this arrangement, there will be no gaps in the recorded material longer than a predetermined small time duration, e. g. one-half second, and hence a substantial amount of material will always be placed on each record. In addition, the system is so arranged that the voice-operated relay will, after cessation of sound signals maintain the machine in playback condition for a period of time slightly longer than this predetermined time duration, and therefore the recording machine will not drop out of playback condition until all of the recorded material has been played back.

Other objects, aspects and advantages will be in part pointed out in, and in part apparent from, the following description considered together with the accompanying drawings in which.

Figure 1:
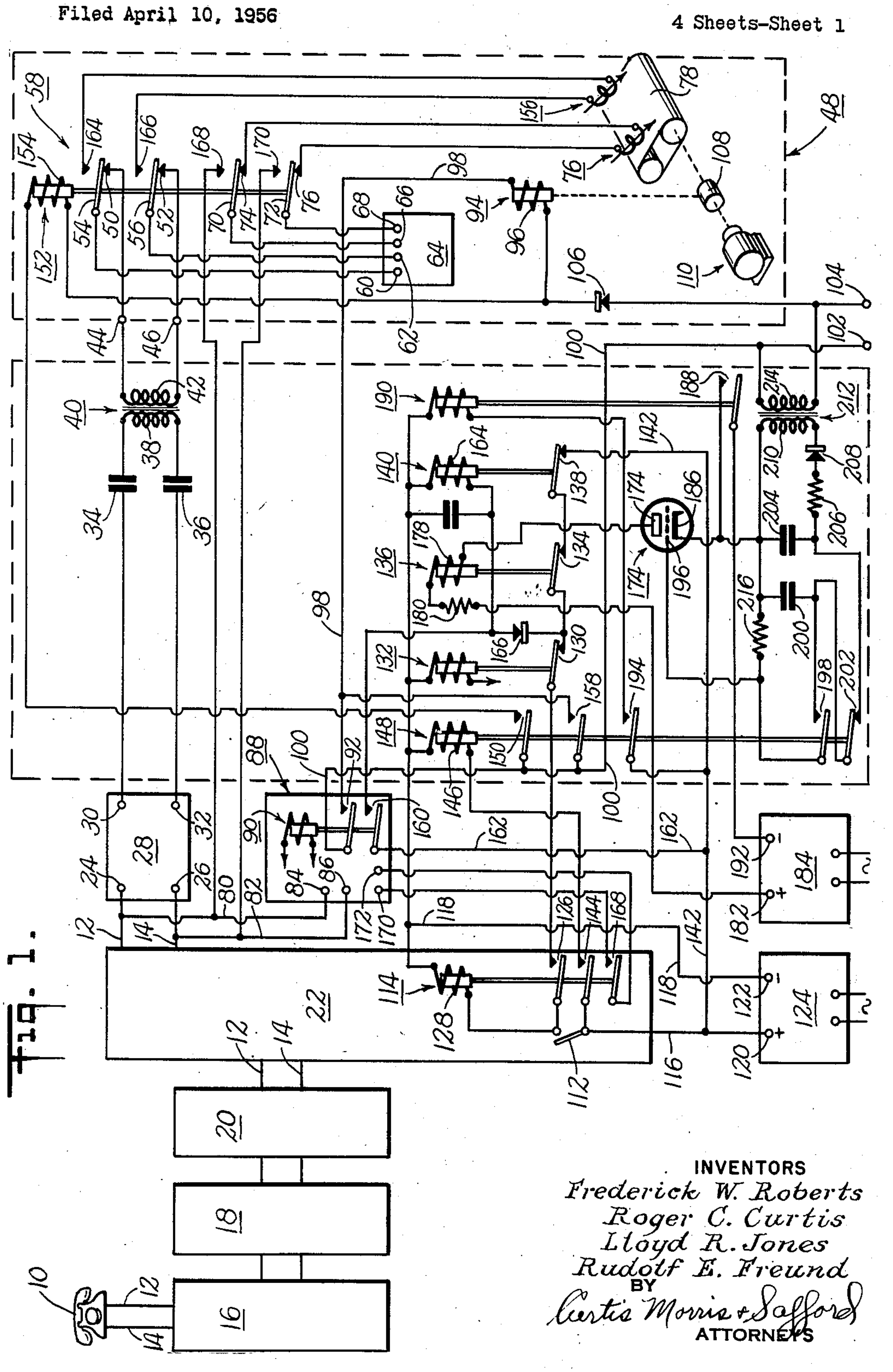
Figure 1 is a circuit diagram, partly in block form, showing a remote dictation system in accordance with the present invention.

Referring now to Figure 1, the system includes a plurality of remote dictator's stations 10 (only one of which is shown in the drawing) each comprising a conventional telephone desk-set connected by two lines 12 and 14 to a conventional telephone switchboard generally indicated by the block 16, e. g. as described in the above-mentioned copending application. When the dictating station 10 is operated for the purpose of establishing connection to a centrally-located recording machine, as by dialing a series of code numbers, the switchboard 16 automatically couples the talking circuit lines 12 and 14 to a line-seizure device generally indicated by a block 18. As outlined in the above application, this line-seizure device automatically interrupts the usual ringing signal produced by the switchboard, and operates to maintain the switchboard connected to the called line, i. e. the line leading to the recording machine.

From the line-seizure device 18, the talking circuit lines 12 and 14 pass to a pulse-forming device generally indicated within a block 20. This latter device, as set forth in the above-mentioned application, is used when the switchboard 16 is of the type that includes devices known as "connectors" for establishing electrical connection between a calling party and a called line. The pulse-forming device serves to transform the distorted dial pulses produced by such a switchboard into proper pulses for operation of the succeeding portions of the system. Where the switchboard is of the type that includes devices known as "selectors," the pulse-forming device may be omitted.

From the pulse-forming device 20, the talking circuit lines 12 and 14 are connected to a pulse-interpreting device generally indicated within a block 22, and which in most respects is similar to the corresponding equipment identified in the above-mentioned application by the reference numeral 84. This equipment is responsive to the dial pulses transmitted from the remote dictator's station 10 and establishes certain control functions at the central recording machine in accordance with the number of pulses received from the remote station.

The talking circuit lines 12 and 14 pass through this interpreting device and are connected to two input terminals 24 and 26 of a speech delay unit generally indicated within a block 28, and described more fully hereinbelow with reference to Figure 2. This latter unit introduces a fixed amount of delay time in the transmission of speech signals, e. g. approximately 200 milliseconds, and transmits the delayed speech signals at the proper intensity level from a pair of output terminals 30 and 32, through two coupling capacitors 34 and 36, to the input winding 38 of an audio transformer generally indicated at 40. The secondary winding 42 of this transformer is connected to the input terminals 44 and 46 of a conventional recording machine generally indicated within a block 48.

In the machine 48, the voice signals pass through a pair of fixed contacts 50 and 52 and a corresponding pair of movable arms 54 and 56 of a change-over switch generally indicated at 58, and are coupled to the input terminals 60 and 62 of an amplifier unit generally indicated at 64. The amplified voice signals pass through amplifier output terminals 64 and 66, through a pair of movable arms 68 and 70, a corresponding pair of fixed contacts 72 and 74 and are fed to a recording head generally indicated at 76. This recording head imparts the sound signals to a belt-type sound record 78 movable thereby.

Figure 3:
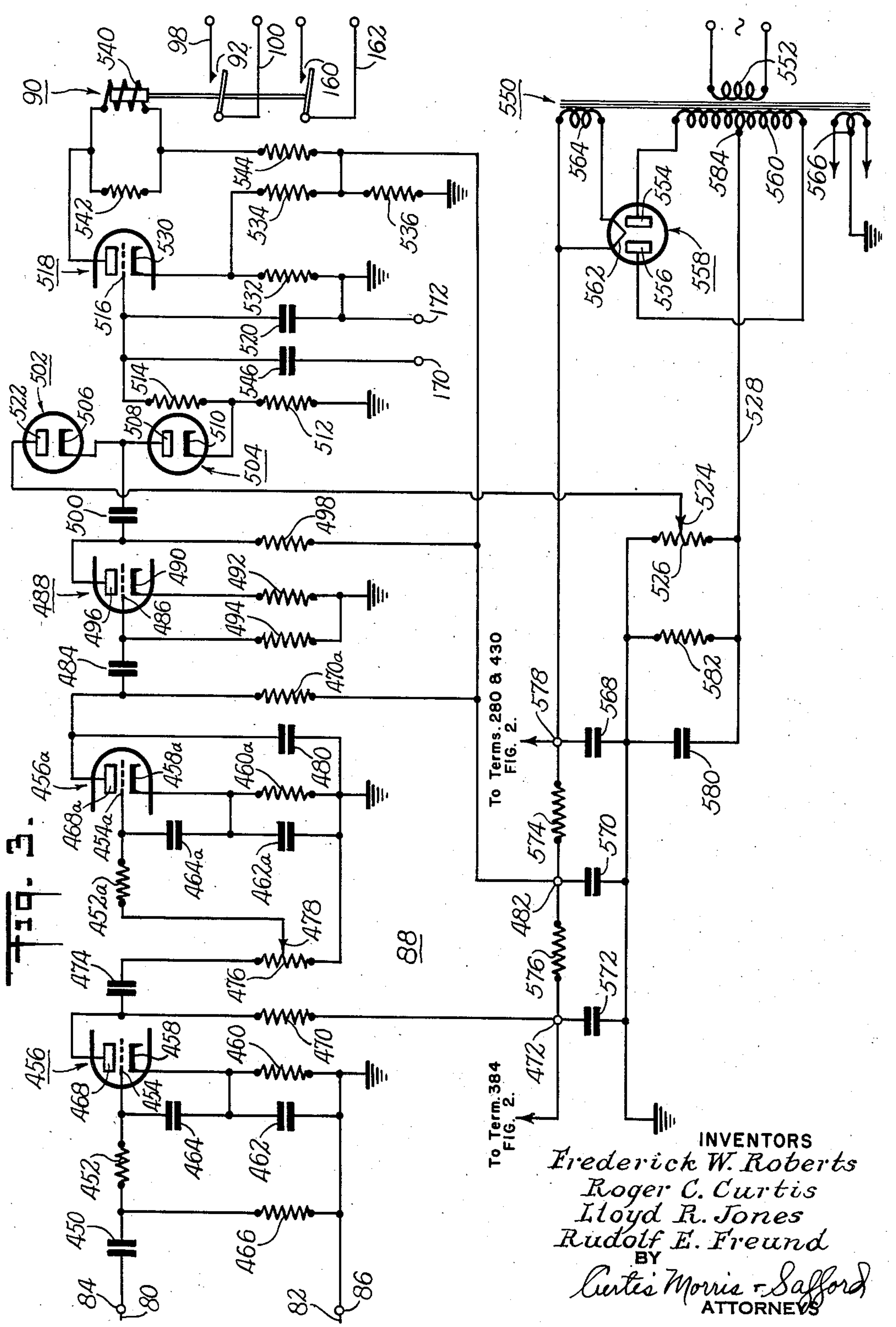
Figure 3 is a circuit diagram showing a voice-operated relay unit used with the system of Figure 1.

Referring again to the pulse interpreting device 22, the voice signals leaving this device on lines 12 and 14 also are coupled, through lines 80 and 82, to the input terminals 84 and 86 of a voice-operated relay unit generally indicated in brief outline form at 88, the details being presented in Figure 3. This unit includes a clutch relay generally indicated at 90 which, as will be explained in connection with Figure 3, is arranged to be energized whenever voice signals are fed to the input terminals 84 and 86.

Energization of this relay 90 causes its contacts 92 to close and complete an energizing circuit for a clutch solenoid generally indicated at 94, located in the dictating machine 48. This circuit may be traced from the upper end of the solenoid winding 96, along a line 98 through the contacts 92 of the clutch relay, along a line 100 to one terminal 102 of an A.-C. power source, e. g. 115 volts, 60 cycles; and from the other A.-C. power terminal 104 through a rectifier 106 to the lower end of the winding 96 of the clutch solenoid 94. Energization of this solenoid actuates a clutch diagrammatically indicated at 108, which in turn transmits power from a drive motor 110 to the movable sound record 78 and (by conventional means not shown) drives the recording head 76 transversely with respect to the record movement.

Accordingly, when the dictator speaks into the transmitter unit of the remote dictation station 10, the resultant sound signals actuate the clutch 108 and start the record 78 moving by the travelling recording head 76. These sound signals also pass through the speech delay unit 28, where they are delayed a fixed amount of time, e. g. 200 milliseconds, and are fed to the recording head 76. With this arrangement, the record 78 will be able to get up to proper operating speed before the sound signals arrive at the recording head, and consequently there will be no loss in recorded material. Further, means are provided for delaying drop-out of the voice-operated clutch relay 90 after cessation of the sound signals, as will be explained hereinbelow, so that the record 78 will continue to move at its proper speed until all of the transmitted signals have been received by the recording head 76.

When it is desired to play back a portion of the recorded material, the dictator operates the dial of his telephone instrument 10, e. g. by dialing the digit "6." This sets up a train of impulses which are transmitted through the switchboard 16, the line seizure device 18, the pulse-forming device 20 (when used), to the pulse interpreting device 22. By means such as are described in detail in the above-mentioned copending application, this train of impulses causes a momentary closure of a switch 112 in the pulse-interpreting device, and which corresponds to the "stepping switch" identified by the reference numeral 260 in that application. Closure of this switch energizes a "play-back" relay, generally indicated at 114, through a pair of lines 116 and 118 which are connected respectively to output terminals 120 and 122 of a D.-C. power supply generally indicated at 124.

Energization of this play-back relay 114 closes a set of locking contacts 126 which maintain the flow of energizing current for the relay after the switch 112 is again opened. This circuit may be traced from the lower end of the relay winding 128, through the locking contacts 126, through a set of contacts 130 of a "reset" relay generally indicated at 132, through a set of contacts 134 of a "time-out" relay generally indicated at 136, through a set of contacts 138 of a "play-back sensing relay" generally indicated at 140, and along a line 142 to the positive terminal 120 of the D.-C. power supply 124.

Operation of the play-back relay 114 also closes a set of its contacts 144 which complete an energizing circuit from the D.-C. power supply 124 to the winding 146 of a "play-back control" relay generally indicated at 148. The consequent closure of the contacts 150 of this latter relay completes an energizing circuit for a play-back solenoid generally indicated at 152 located in the dictating machine 48, the circuit being traced from one A.-C. power terminal 102, along the power line 100, through the relay contacts 150, through the winding 154 of the play-back solenoid, and through the rectifier 106 to the other terminal 104. Actuation of this solenoid 152 causes the change-over switch 58 to be moved from its "record" position (as shown) to its "reproduce" position. A second set of contacts 158 of the play-back control relay 148 are connected in parallel with the contacts 92 of the voice-operated clutch relay 90. Consequently, when the play-back control relay is energized, an alternate power circuit is completed to the clutch solenoid 94, which in turn actuates the machine clutch 108 to start the record 78 moving.

As in conventional dictating machines now sold commercially, a reproducing head generally indicated at 156 is engaged with the record 78 and is driven transversely along the record surface a short fixed distance behind the recording head 76. The reproducing head therefore follows in the grooves made by the recording head, and develops signals in accordance with the recorded material.

The signals picked up by the reproducing head 156 are fed through a pair of fixed contacts 164 and 166 and the corresponding pair of movable arms 54 and 56, of the changeover switch 58, to the input terminals 60 and 62 of the amplifier unit 64. The amplified signals pass from the amplifier output terminals 66 and 68 through the movable arms 70 and 72 and a corresponding pair of fixed contacts 168 and 170 to the voice channel lines 80 and 82. From these latter lines, the voice signals pass to the main talking circuit lines 12 and 14 and are transmitted back to the remote dictation station 10 where they are converted to sound signals to be listened to by the remote dictator. With certain types of change-over switch constructions, there may be sufficient capacitive coupling to produce oscillations due to feedback through the delay unit 28. This can be avoided by providing conventional mute circuit arrangements (not shown), e. g. by shorting the output terminals 30 and 32 whenever the system is in playback condition.

The play-back signals on lines 80 and 82 also are coupled to the input terminals 84 and 86 of the voice-operated relay unit 88, and accordingly cause the clutch relay 90 to be energized. The resultant closure of a second set of its contacts 160 completes an energizing circuit for the play-back sensing relay 140, this circuit being traced from the positive terminal 120 of the D.-C. power supply 124, along a line 162 and through the contacts 160, through the relay winding 164, and back along line 118 to the negative terminal 122 of the power supply 124. When the play-back sensing relay is energized, its contacts 138 open and thereby break the hold-in circuit previously maintaining the play-back relay 114 in energized condition.

However, the play-back relay 114 does not drop out at this time, because an alternate hold-in circuit is established by operation of the voice-operated clutch relay 90. This circuit may be traced from the locking contacts 126 of the play-back relay, through contacts 130 of the reset relay 132, through a rectifier 166 to the clutch relay contacts 160, and back along line 162 to the positive terminal 120 of the D.-C. power supply 124. The rectifier 166 is included in this circuit to assure that the play-back sensing relay 140 does not become energized except when the clutch relay 90 is actuated.

As mentioned above, the voice-operated relay unit 88 is arranged in such a manner that, during recording, the clutch relay 90 remains actuated for a predetermined length of time after cessation of voice signals fed to the input terminals 84 and 86. When the system is switched to playback condition, the closure of a third set of contacts 168 of the play-back relay 114 completes a circuit by shorting together a pair of terminals 170 and 172 in the voice-operated relay unit, to increase this "release time" approximately 20%. (This portion of the circuitry will be described in more detail with reference to Figure 3 hereinbelow.) With this arrangement, the voice-operated clutch relay always will remain actuated, when the system is in playback condition, during the small gaps in recorded material caused by deactuation of the clutch during normal dictation.

Since the dictation system may be placed in play-back condition at a point where there is no recorded material for the reproducing head to pick up, provision also is made for assuring that the system will automatically go back to its normal condition ready for recording after a predetermined length of time, e. g. 10 or 20 seconds. The time-out relay 136 serves this function, and in a manner to be explained, the contacts 134 of this relay open up after such a length of time to interrupt the hold-in circuit for the play-back relay 114 and thereby cause the change-over switch 58 to return to its record condition (as shown). It may be noted that, once the voice-operated relay unit 88 has become actuated by virtue of voice signals fed from the reproducing head 162, the opening of contacts 134 of the time-out relay does not de-actuate the play-back relay 114, since this latter relay is energized through an alternate hold-in circuit including contacts 160 of the clutch relay 90 as described above.

The time-out relay 136 is controlled by a vacuum tube generally indicated at 174, and for this purpose the anode 176 of this tube is connected to the lower end of the relay winding 178 with the upper end of this winding being connected through a current limiting resistor 180 to the positive terminal 182 of a D.-C. power supply generally indicated at 184. The cathode 186 of this tube is connected through a set of contacts 188 of a "play-back slave relay" generally indicated at 190, to the negative terminal 192 of the power supply 184.

The slave relay 190 is energized to close its contacts 188 whenever the play-back control relay 148 is energized, by means of a set of contacts 194 of this latter relay. However, when the contacts 188 are first closed, the grid 196 of the tube 174 is at a substantially negative potential with respect to the cathode 186 so that the tube will not initially conduct current through the time-out relay 136. This grid is driven negative by the closing of a set of contacts 198 of the play-back control relay 148, i. e. this set of contacts connects a charged capacitor 200 directly between the cathode 186 and the grid 196. Prior to the time the play-back control relay 148 is actuated, this capacitor 200 has been charged up through another set of contacts 202 of the play-back control relay which connect the capacitor to a conventional D.-C. power supply comprising a filter capacitor 204, a series resistor 206, and a rectifier 208. Alternating voltage is supplied by the secondary winding 210 of a power transformer generally indicated at 212, the primary winding 214 of which is connected to the A.-C. input terminals 102 and 104.

Accordingly, when the time-out relay energizing circuit is first completed by closure of contacts 188 of the play-back slave relay 190, there will be no current flow through the time-out relay and the contacts 134 thereof will remain closed to hold the play-back relay 114 in actuated condition. However, the charged capacitor 200 gradually discharges through a resistor 216 connected between the grid 196 and the cathode 186 of the tube 174, and hence the grid gradually becomes more positive until it reaches a potential (e. g. after 10 to 20 seconds) such that current will commence flowing through the tube and the winding 178 of the time-out relay. The consequent energization of the time-out relay opens its contacts 134 and, as explained above, causes the dictation system to be switched from its reproduce condition to its normal condition ready for recording.

Figure 2:
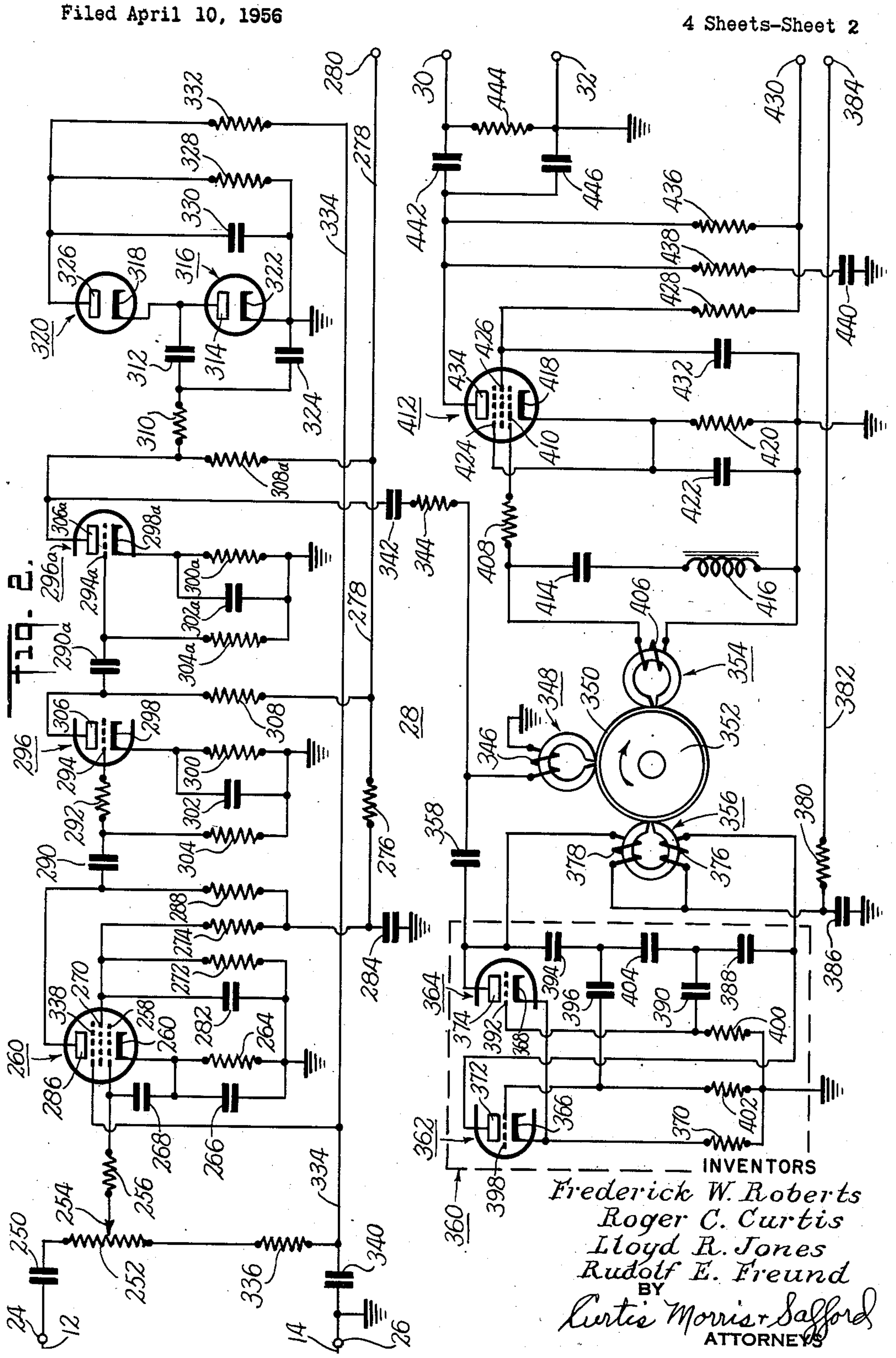
Figure 2 is a circuit diagram showing a speech delay unit used with the system of Figure 1.

Figure 2 shows a detailed circuit diagram of the speech delay unit generally indicated in Figure 1 within the block 28. Referring to the upper left hand corner of Figure 2, the talking circuit lines 12 and 14 are connected respectively to the input terminals 24 and 26 of this unit, with the latter terminal connected to the common system ground. Speech signals from the dictator's station 10 (Figure 1) pass from the upper input terminal 24 through a coupling capacitor 250 to one end of a sensitivity-adjusting potentiometer 252, the movable arm 254 of which is connected through a resistor 256 to the control grid 258 of a pentode vacuum tube generally indicated at 260. This tube forms a first stage of amplification for intensifying the speech signals to a level appropriate for recording on a rotating magnetic drum, as described below, and also includes feedback circuit means to maintain this level nearly constant regardless of variations in input signal strength.

The cathode 262 of this tube 260 is connected in the usual way through a small biasing resistor 264, in parallel with a by-pass capacitor 266, to ground. In addition, a coupling capacitor 268 is bridged between the cathode and the control grid 256. The screen grid 270 is provided with operating potential by a voltage-dividing network comprising a resistor 272 connected to ground and two series resistors 274 and 276 connected to a high-voltage lead 278; this lead is in turn connected to a terminal 280 which is supplied with suitable positive voltage by a D.-C. power supply to be described with reference to Figure 3. Decoupling capacitors 282 and 284 are provided to minimize supply potential fluctuations, and to avoid interaction between amplifier stages supplied in common from the high-voltage lead 278.

The anode 286 of the tube 260 is connected through a load resistor 288 to the high-voltage lead 278, and the amplified speech signals appearing on this anode are fed through a coupling capacitor 290 and an input resistor 292 to the control grid 294 of a triode vacuum tube generally indicated at 296. The cathode 298 of this latter tube is connected to ground in the usual way through a small biasing resistor 300 in parallel with a by-pass capacitor 302, and a grid return resistor 304 is connected between ground and the input resistor 292. The anode 306 of this tube is connected through a load resistor 308 to the high-voltage lead 278, and the speech signals on this anode are fed through a coupling capacitor 290*a* to the control grid 294*a* of a second triode tube 296*a*. This latter tube is connected as a further stage of amplification in a manner like the previous stage, and corresponding elements thereof are identified with the same reference numerals with differentiating suffixes.

The amplified speech signals on the anode 306*a* are rectified in a voltage-doubler circuit, the D.-C. output of which is fed back to the first amplifier tube 260 to control the sensitivity of amplification in accordance with the amplitude of the signals received from the talking circuit lines 12 and 14. For this purpose, the anode 306*a* is connected through a resistor 310 and a charging capacitor 312 to the anode 314 of one diode 316 and the cathode 318 of a second diode 320. The cathode 322 of the first diode is connected to ground, and an input capacitor 324 is connected between ground and the resistor 310.

It will be apparent that the capacitor 312 is charged up to a potential substantially equal to the amplitude of signal on the anode 306*a* of the tube 296*a*, because of current flow through the lower diode 316 during positive swings of the signal. During the negative half-cycles, this charge potential is in series with the applied signal and hence effectively doubles the voltage of conducting polarity fed to the upper diode 320. This latter diode hence conducts current through a load resistor 328 connected between its anode 336 and ground, and charges up a filter capacitor 330 to essentially twice the signal amplitude.

The anode 326 of the upper diode also is connected through an isolation resistor 332, a feedback lead 334, and a resistor 336 to the lower end of the input potentiometer 252. With this arrangement, the D.-C. voltage developed in the voltage-doubler circuit described controls the bias on the first amplifier tube 260 and so automatically adjusts the gain of amplification to assure a nearly constant signal amplitude on the anode 306*a* of tube 296*a*. The feedback lead 334 also is connected to the suppressor grid 338 of the first tube 260, and a filter capacitor 340 is connected between this lead and ground to smooth out rapid fluctuations in the feedback voltage.

Referring again to the third amplifier tube 296*a*, the stabilized speech signals on the anode 306*a* are coupled through a capacitor 342 and a series resistor 344 to the energizing winding 346 of a magnetic recording head generally indicated at 348. This head may, for example, be of the type known commercially as "Sure TR-16." This recording head is mounted adjacent a strip of magnetizable material 350 secured to the surface of a (clockwise) rotating drum 352 as more fully described with reference to Figure 4, and in a known manner activates this material in accordance with the speech signals received from the amplifier tube 296*a*.

The magnetic impressions formed by the head 348 on the strip 350 move around with the drum 352 and are sensed by a magnetic pick-up head generally indicated at 354. Accordingly, the corresponding signals developed in the pick-up head are delayed by the amount of time required for the magnetically recorded portion to travel from beneath the recording head 348 to beneath the pick-up head, e. g. about 200 milliseconds. As the drum continues to rotate, the recorded portion passes beneath an erase head generally indicated at 356, and which serves to clear the strip 350 of magnetic impressions so that further recording may be made thereon by the head 348.

To increase the sensitivity of magnetic recording, and also to decrease distortion effects, the recording head winding 346 is supplied through a coupling capacitor 358 with a high-frequency bias signal, e. g. 30,000 C. P. S. This bias signal is obtained from an oscillator generally indicated within a broken line block 360, and which includes a pair of triode tubes 362 and 364 having their cathodes 366 and 368 connected together and through a small resistor 370 to ground. The anodes 372 and 374 of these tubes are coupled together by two balanced, series-connected windings 376 and 378 wound around the erase head core, preferably formed of a ferrite material.

Energizing potential for the oscillator tube anodes 372 and 374 is furnished by a connection from the center point of the windings 376 and 378, through a resistor 380 and a lead 382, to a terminal 384 which is supplied with positive voltage by a D.-C. power supply to be described with reference to Figure 3. A decoupling capacitor 386 is provided in the usual way.

To generate oscillations, the output of each tube is coupled to the input of the other tube. That is, the anode 372 of tube 362 is coupled through a set of two capacitors 388 and 390 to the grid 392 of tube 364; and the anode 374 of tube 364 is coupled through a second set of two capacitors 394 and 396 to the grid 398 of the tube 362. Each of the grids 392 and 398 also is connected to ground through respective grid-return resistors 400 and 402.

Bridged between the two coupling capacitors 388 and 394, and effectively in series therewith, is another capacitor 404; these three capacitors in conjunction with the erase head windings 376 and 378 form a resonant "tank" circuit which controls the frequency of oscillations generated by the oscillator 360. The circulating current passing through the windings produces the magnetic flux in the erase head required to clear magnetic recording impressions placed on the rotating strip 350. It may particularly be noted that the erasing energy available with this arrangement is considerably higher than in the usual construction. That is, the oscillator circulating current is approximately two or three times greater than the current that can be drawn off from the oscillator to an external load. With this increased output energy, no power amplifier tubes are needed to operate the erase head, and the use of a separate oscillator coil is avoided.

The delayed speed signals sensed by the pick-up head 354 are coupled from the head winding 406 through a resistor 408 to the control grid 410 of a pentode vacuum tube generally indicated at 412, and which provides further amplification for the signals to be transmitted to the central recording machine. Connected in parallel with the head winding 406 is a resonant trap circuit consisting of a capacitor 414 in series with an inductor 416. This circuit is tuned to the frequency of the signals developed by the oscillator 360 and serves to filter them out of the speech circuits.

The cathode 418 of the tube 412 is connected in the usual way to ground through a small biasing resistor 420 in parallel with a decoupling capacitor 422, and also is connected to the suppressor grid 424. The screen grid 426 of this tube is supplied with energizing potential through a voltage-dropping resistor 428 connected to a high-voltage terminal 430 which, in common with terminal 280, is furnished with positive voltage by a D.-C. power supply to be described. A decoupling capacitor 432 is connected to the screen grid in the usual way.

The anode 434 of the tube 412 is connected through a load resistor 436 to the high-voltage terminal 430, and also is connected to ground through a frequency-selective network comprising a resistor 438 in series with a capacitor 440. The delayed and amplified speech signals appearing on this anode 434 are coupled through a capacitor 442 to one output terminal 30, the other output terminal 32 being connected to ground; a resistor 444 is bridged across these output terminals, and a capicitor 446 is connected between the anode 434 and ground. As described with reference to Figure 1, the speech signals developed at these output terminals 30 and 32 are transmitted to the central recording machine.

Shown in Figure 3 is a detailed circuit diagram of the voice-operated relay and amplifier arrangement generally indicated within the block 88 of Figure 1. Referring now to the upper left hand corner of Figure 3, the talking circuit lines 80 and 82 are connected to the respective input terminals 84 and 86, the latter also being returned to the common system ground. The speech signals from these lines are fed through a coupling capacitor 450 and an input resistor 452 to the grid 454 of an amplifier tube generally indicated at 456 and serving as a first stage of amplification. The cathode 458 of this tube is in the usual way returned to ground through a small bias resistor 460 in parallel with a by-pass capacitor 462 and also is coupled to the grid 454 by a capacitor 464. A grid-return resistor 466 is connected between ground and the input resistor 452.

The anode 468 is supplied with operating potential through a load resistor 470 connected to one positive voltage terminal 472 of a D.-C. power supply to be described. The amplified speech signals appearing on this anode are coupled through a capacitor 474 to one end of a sensitivity-adjusting potentiometer 476, the other end of which is connected to ground. The signals picked off by the movable arm 478 of this potentiometer are fed through an input resistor 452*a* to the grid 454*a* of a second tube 456*a*, which serves as an additional stage of amplification substantially similar to the previous one; corresponding elements are identified with the same reference numerals and differentiating suffixes. In this second stage, there is additionally a capacitor 480 bridged between the anode 468*a* and ground, and the load resistor 470 is connected to a second high-voltage terminal 482 in the D.-C. power supply.

The speech signals on the anode 468*a* of this latter tube are fed through a capacitor 484 to the grid 486 of a third amplifier tube generally indicated at 488, the cathode 490 of which is returned to ground through a small resistor 492, un-by-passed to provide a slight amount of degeneration. A grid-return resistor 494 is connected between the grid 486 and ground, and the anode 496 is provided with energizing potential through a load resistor 498 connected to the high voltage terminal 482.

The output signals produced by this tube 488 are fed through a coupling capacitor 500 to a rectifier circuit comprising two diodes 502 and 504 which are arranged in the form of a voltage doubler like that described with reference to Figure 2. The capacitor 500 is connected to the cathode 506 of the upper diode 502 and to the anode 508 of the lower diode 504. Output current from this rectifier circuit flows from the cathode 510 of the lower diode through a load resistor 512 to ground; the output signal thus developed is fed through a resistor 514 to the grid 516 of an amplifier tube 518, and also charges up a capacitor 520 connected between this grid and ground.

Because remote dictation stations frequently are located in regions where there is substantial surrounding noise, e. g. typewriters, etc., it is important to arrange the system in such a way that normal background noises will not "trigger" the voice-operated relay. This is accomplished by means of a "threshold control" associated with the rectifier circuit described above.

For this purpose, the anode 522 of the upper diode 502 is connected to the movable arm 524 of a bias potentiometer 526; one end of this potentiometer is connected to ground, while its other end is connected to a negative supply voltage lead 528 (e. g. having a potential of minus 28 volts). Thus, the anode 522 is biased negatively with respect to ground by an amount determined by the setting of the potentiometer.

If the amplitude of the signal coupled through the capacitor 500 is less than the bias voltage, there will be no conduction through the upper diode 502, and the rectified voltage fed to the tube grid 516 by conduction through the lower diode will be roughly proportional to the signal amplitude. However, if the signal amplitude exceeds the bias, the upper diode will conduct on the negative signal swing and charge up the capacitor 500 to a potential about equal to the difference between the bias voltage and the signal amplitude. This charge potential effectively adds to the signal amplitude during the positive portion of the cycle, i. e. while the lower diode is conducting, and hence contributes a substantial increment to the rectified voltage applied to the grid 516 when the threshold determined by the amount of bias voltage has thus been passed.

The tube 518 is so arranged that it will conduct heavily whenever the grid voltage has been driven positive an amount corresponding to this threshold setting. For this purpose, the cathode 530 is biased positive by a voltage dividing network comprising a small resistor 532 connected between the cathode and ground, and a second resistor 534 connected between the cathode and the high-voltage terminal 482. A bleed resistor 536 is connected between this high-voltage terminal and ground.

The tube anode 538 is connected through the winding 540 of the voice-operated relay 90 (see also Figure 1), in parallel with a resistor 542, and through a series resistor 544 to the high-voltage terminal 482. Accordingly, when the grid 516 has been driven positive by a sufficiently large voice signal on the input terminals 84 and 86, the tube will conduct current through this winding and cause actuation of the relay, thereby closing its contacts 92 and 160. As explained hereinabove, closure of these contacts control operation of the recording machine clutch and playback functions.

When the voice signals cease, the tube 518 will continue to conduct and hold the relay 90 actuated a short period of time thereafter, e. g. 400 to 500 milliseconds. This extended "release time" assures that all of the dictated material transmitted through the delay unit 28 (see Figure 1) will have been recorded on the record 78 before the record mandrels stop rotating.

The tube 518 continues to conduct after cessation of speech signals because the capacitor 520 tends to hold the grid 516 positive as it gradually discharges through resistors 512 and 514, and these circuit elements are so proportioned that the tube will cease conduction only after the desired time period has elapsed. Typical values for these elements are as follows:

| | | |
|---|---|---|
| Resistor **512** | megohms | 3.3 |
| Resistor **514** | do | 1 |
| Capacitor **520** | microfarads | 0.1 |

It may also be noted that capacitor 520 cannot charge up to a potential greater than the positive bias potential of the cathode 530, because grid current will then flow through the tube 518. Hence this capacitor will always take substantially the same length of time to discharge, and the time delay between cessation of speech signals and cut-off of the tube will therefore never be greater than the predetermined desired amount.

As mentioned hereinabove, it is important that the release time of the voice-operated relay be somewhat longer (e. g. a total time of about 0.6 second) when the system is set for playback operation, so that the machine clutch will positively remain actuated during speech gaps in the recording. For this purpose, contacts 168 of the play-back relay 114 (see Figure 1) are arranged when the relay is energized to short together the terminals 170 and 172, and thereby connect another capacitor 546 in parallel with capacitor 520. The additional charge placed on capacitor 546 extends the time required for the potential of the grid 516 to drop to the non-conducting region after cessation of voice signals from the reproducing head 156.

The system also is arranged in such a manner that the relay 90 will not pull in until the signals on the input terminals 84 and 86 have continued for a predetermined length of time, e. g. about 50 milliseconds, so as to assure that the machine clutch will not be actuated by sharp background sound impulses (such as the click of a typewriter) produced near the dictator's station. This "integration" effect is due to the finite time required for the capacitor 520 to charge up through the resistor 514 and drive the grid 516 to a potential which causes conduction through the tube 518.

Energizing potentials for the tubes in the delay unit 28 and the voice-operated relay unit 88 are provided by a D.-C. power supply shown in the lower portion of Figure 3. This supply includes a power transformer generally indicated at 550 having a primary winding 552 connected to the usual A.-C. power lines. The anodes 554 and 556 of a full-wave rectifier tube 558 are connected to respective ends of a high-voltage secondary winding 560 of this transformer. The tube filament 562 is connected across one low-voltage secondary winding 564, and another low-voltage secondary 566 is provided for the heaters of other tubes in the system.

The rectified current flows from the tube filament 562 to a filter network comprising three shunt capacitors 568, 570 and 572, and two series dropping resistors 574 and 576. The upper plate of each capacitor is connected to respective output terminals 472, 482 and 578. The first output terminal 472 is in turn connected to terminal 384 (Figure 2), while the third terminal 578 is connected to terminals 280 and 430 (Figure 2).

The lower plates of the shunt capacitors 568, 570 and 572 are connected to ground, and through a filter network comprising a capacitor 580 in parallel with a resistor 582 to the center-tap point 584 of the high-voltage secondary winding 560. This latter arrangement develops a negative voltage across the bias-potentiometer 526 which serves to set the threshold signal level as previously explained.

Figure 4:
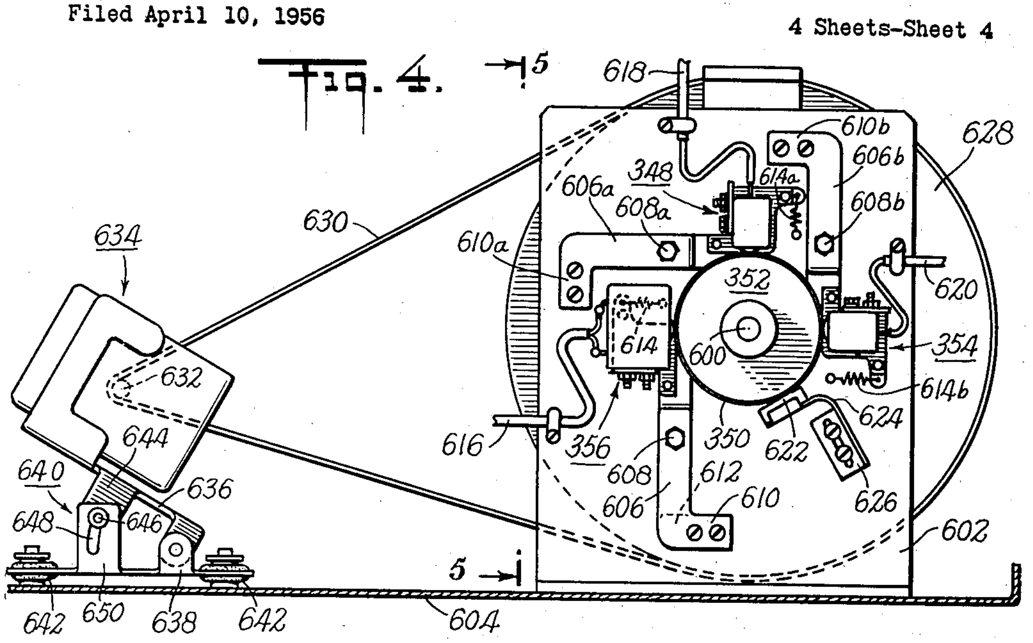
Figure 4 is an elevation view of a rotatable magnetic drum arrangement forming part of the speech delay unit of Figure 2.
Figure 5:
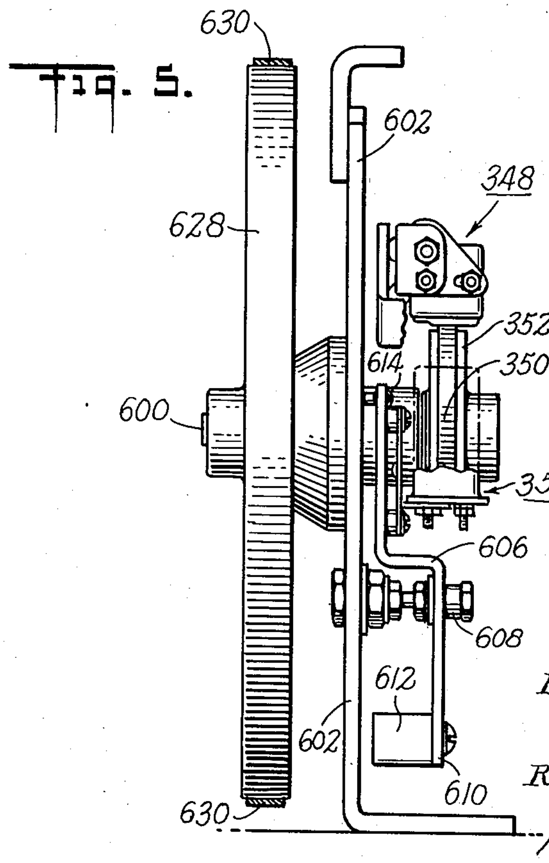
Figure 5 is a vertical section taken along line 5—5 of Figure 4.

Figures 4 and 5 show structural details of the magnetic drum arrangement described briefly with reference to Figure 2, and which serves to delay the speech signals for approximately 200 milliseconds in transmission from the dictator's station 10 to the centrally-located recording machine 48. The overall fidelity of the recording system is, nevertheless, maintained because the speech-delay device to be described has a substantially flat frequency-response across the range of voice frequencies to which the recording machine is normally responsive.

Referring now to the right-hand portion of Figure 4, the non-magnetic drum 352 is shown fastened to a rotatably-driven shaft 600 supported by bearing surfaces and extending through a vertical support plate 602 mounted on a horizontal base plate 604. Secured within a slot in the peripheral surface of the drum is the continuous strip 350 of magnetizable material, e. g. a rubber-like composition impregnated with magnetic pigment. Spaced around the drum 352 and lightly urged against the magnetic strip 350 are the erase head 356, the recording head 348 and the pick-up head 354. Each of these heads is rockably supported for movement towards and away from the drum in a substantially identical manner, and accordingly only one of these support arrangements will be described herein. Corresponding support elements for these heads are identified in the drawings with the same reference numerals and differentiating suffixes.

Referring now to the erase head 356 adjacent the left-hand edge of the drum, this head is mounted on one end of a generally L-shaped arm 606 which is pivotally secured to a pin 608 fastened to the support plate 602 (see also Figure 5). Screwed to the remote (lower) end 610 of this arm is a counterbalancing weight 612 which serves to approximately balance the torque produced by the weight of the erase head about the pivot pin 608. The pole pieces of the head are gently pressed against the magnetizable strip 350 by a small spring 614 (shown in dotted outline) secured between the upper end of the arm 606 and the support plate 602.

A pair of wires 616 is connected to the erase head 356 for feeding the high-frequency signal thereto from the oscillator unit described with reference to Figure 2. A pair of wires 618 is connected to the recording head 348 (at the top of the drum) for transmitting voice signals thereto from the preamplifier in the delay unit 28 of Figure 2. Correspondingly, a pair of wires 620 is connected to the pick-up head 354 (adjacent the right-hand edge of the drum) for transmitting the delayed voice signals to the final amplifier stage in the delay unit 28.

Pressed against the lower right-hand portion of the magnetic strip 350 is a lubricating pad 622 mounted on one end of a bent spring-arm 624 secured to the support plate 602 by an adjustable bracket 626. This pad is impregnated with oil, e. g. silicone, and applies a thin film of this oil to the magnetic strip for the purpose of reducing wear on the strip and the magnetic heads in contact therewith.

The shafts 600 extends through the support plate 602 and is secured at its remote end to a drive wheel 628. As shown in Figure 4, this drive wheel is rotated by an endless belt 630 which at its left-hand end is wrapped around the shaft 632 of an electric motor generally indicated at 634. This motor is secured to a tiltable platform 636 which is pivoted at one end about a pair of spaced-apart uprights 638. These uprights form part of a motor mounting, generally indicated at 640, which is secured to the base plate 604 by shock-absorbing elements 642.

Spaced from the pivoted end of the platform 636 is a pair of depending flanges 644 having a small pin 646 extending therethrough. This pin rides in a curved slot 648 formed in a second pair of uprights 650 on the motor mounting 640, so that the platform 636 is suitably supported and guided for pivotal movement about the first pair of uprights 638. The motor weight tends to rotate the platform counterclockwise about its pivot point and thereby maintains the endless belt 630 under tension to assure that rotational motion is continuously transmitted to the drive wheel 628 at constant speed.

The above-described rotating drum and magnetic head construction is commercially advantageous especially because of its simplicity and relatively low construction cost. Also, the sensitive pick-up head 354 is essentially undisturbed by the relatively high-power signals produced by the erase head 356 because the latter is located adjacent the opposite side of the drum 352; the remote location of the motor 634 further assures quiet operation of the pick-up head.

The amount of delay time introduced by the drum unit is, of course, determined by the spacing between the recording head 348 and the pick-up head 354, and also by the speed of drum rotation. It has been found that this time delay should be at least about 25 milliseconds, to permit the record 78 (Figure 1) to achieve proper operating speed before recording thereon commences. It has further been found that the delay time should preferably be about 200 milliseconds. Such an extended time delay minimizes the sensitivity requirements for the voice-operated relay relay unit 88 (Figure 3) and also permits this unit to include provision for an integration effect (as described above) to assure that the relay is not actuated by sharp high-intensity background noise pulses.

Although a specific preferred embodiment of the invention has been set forth in detail, it is desired to emphasize that this is not intended to be exhaustive or necessarily limitative; on the contrary, the showing herein is for the purpose of illustrating one form of the invention and thus to enable others skilled in the art to adapt the invention in such ways as meet the requirements of particular applications, it being understood that various modifications may be made without departing from the scope of the invention as limited by the prior art.

We claim:

1. A remote dictation system comprising, in combination, a plurality of remote dictator's stations each including sound transducing apparatus and a dial-operated switch, telephone switchboard apparatus with means for connecting said dictator's stations to said switchboard apparatus, a centrally-located recording machine having a movable record and a recording head arranged for relative traveling movement, motor drive means for producing said relative travelling movement, control means for activating said drive means, said machine also including at least one operating element arranged when actuated to accomplish a predetermined function relating to operation of the machine for dictation purposes, a talking circuit coupling said recording machine to said switchboard apparatus in such a manner that said switchboard may be conditioned to establish a sound channel between any one of said remote dictator's stations and said machine, means responsive to pulses transmitted through said sound channel by said dial-operated switch and arranged to actuate said operating element in said machine when a predetermined number of dial impulses has been produced at said one dictator's station, a voice signal-responsive device coupled to said sound channel and arranged when energized by sound signals produced by said sound transducing apparatus to actuate said control means and thereby activate said drive means, and means for delaying the transmission of said sound signals to said recording head for a time duration longer than the time required for said drive means to reach proper operating speed.

2. A remote dictation system comprising, in combination, a plurality of remote dictator's stations each including sound transducing apparatus and a dial-operated switch, telephone switchboard apparatus with means for connecting said dictator's stations to said switchboard apparatus, a centrally-located recording machine having a movable record and a recording head arranged for relative travelling movement, motor drive means for producing said relative travelling movement, control means for activating said drive means, said machine also including at least one operating element arranged when actuated to accomplish a predetermined function relating to operation of the machine for dictation purposes, a talking circuit coupling said recording machine to said switchboard apparatus in such a manner that said switchboard may be conditioned to establish a sound channel between any one of said remote dictator's stations and said machine, means responsive to pulses transmitted through said sound channel by said dial-operated switch and arranged to actuate said operating element in said machine when a predetermined number of dial impulses has been produced at said one dictator's station, a voice signal-responsive device coupled to said sound channel and arranged when energized by sound signals produced by said sound transducing apparatus to actuate said control means and thereby activate said motor drive means, a delay unit forming part of said sound channel for delaying the transmission of said sound signals to said machine recording head for a fixed time duration sufficient to permit said drive means to reach proper operating speed before recording of said sound signals commences, said unit including a moving member adapted to receive and retain sound impulse impressions, a sound impulse recording head mounted adjacent said member and cooperating therewith to form impressions thereon in accordance with sound signals transmitted along said channel by said transducing apparatus, a sensing pick-up head mounted adjacent said member at a point spaced from said impulse recording head and adapted to develop sound signals in accordance with impressions formed in said member by said impulse recording head as said impressions pass by said pick-up head, and means for coupling the output of said pick-up head to said machine for recording on said record.

3. A remote dictation system comprising, in combination, a plurality of remote dictator's stations each including sound transducing apparatus and a dial-operated switch, telephone switchboard apparatus with means for connecting said dictator's stations to said switchboard apparatus, a centrally-located recording machine having a movable record and a recording head arranged for relative travelling movement, motor drive means for producing said relative travelling movement, control means for activating said drive means, said machine also including at least one operating element arranged when actuated to accomplish a predetermined function relating to operation of the machine for dictation purposes, a talking circuit coupling said recording machine to said switchboard apparatus in such a manner that said switchboard may be conditioned to establish a sound channel between any one of said remote dictator's stations and said machine, means responsive to pulses transmitted through said sound channel by said dial-operated switch and arranged to actuate said operating element in said machine when a predetermined number of dial impulses has been produced at said one dictator's station, a voice signal-responsive device coupled to said sound channel and arranged when energized by signals produced by said sound transducing apparatus to actuate said control means and thereby activate said drive means, a magnetic delay device forming part of said sound channel for delaying the transmission of said sound signals to said machine recording head for a time duration sufficient to permit said drive means to reach proper operating speed before recording of said sound signals on said record commences, said delay device including a moving member adapted to receive and retain magnetic impressions, a magnetic recording head positioned adjacent said member and arranged to form magnetic impressions thereon in conformance with said sound signals, a magnetic pick-up head positioned adjacent said member and arranged to develop output signals in conformance with impressions on the portion of said member passing thereby, said member moving in a direction from said magnetic recording head and towards said magnetic pick-up head, and circuit means for coupling said output signals to said machine recording head.

4. A remote dictation system comprising, in combination, a plurality of remote dictator's stations each including sound transducing apparatus and a dial-operated switch, telephone switchboard apparatus with means for connecting said dictator's stations to said switchboard apparatus, a centrally-located recording machine having a movable record and a recording head arranged for relative travelling movement, motor drive means for producing said relative travelling movement, control means for activating said drive means, said machine also including at least one operating element arranged when actuated to accomplish a predetermined function relating to operation of the machine for dictation purposes, a talking circuit coupling said recording machine to said switchboard apparatus in such a manner that said switchboard may be conditioned to establish a sound channel between any one of said remote dictator's stations and said mcahine, means responsive to pulses transmitted through said sound channel by said dial-operated switch and arranged to actuate said operating element in said machine when a predetermined number of dial impulses has been produced at said one dictator's station, a voice signal-responsive device coupled to said sound channel and arranged when energized by sound signals produced by said sound transducing apparatus to actuate said control means and thereby activate said drive means, a magnetic delay unit forming part of said sound channel for delaying the transmission of said sound signals to said machine recording head for a time duration sufficient to permit said drive means to reach proper operating speed before recording of said sound signals on said record commences, said unit including a rotating member of cylindrical configuration adapted to receive and retain magnetic impressions, a magnetic recording head mounted adjacent the periphery of said member and having an input circuit coupled to said talking circuit to receive said sound signals therefrom, said magnetic recording head being arranged to form magnetic impressions on said member in accordance with said sound signals, a magnetic pick-up head mounted adjacent the periphery of said member at a point spaced from said magnetic recording head, said member being rotated in such a direction that its periphery moves from said magnetic recording head towards said pick-up head, and circuit means for coupling the output of said pick-up head to said machine recording head.

5. A remote dictation system comprising, in combination, a plurality of remote dictator's stations each including sound transducing apparatus and a dial-operated switch, telephone switchboard apparatus with means for connecting said dictator's stations to said switchboard apparatus, a centrally-located recording machine having a movable record and a recording head arranged for relative travelling movement, motor drive means for producing said relative travelling movement, control means for activating said drive means, said machine also including at least one operating element arranged when actuated to accomplish a predetermined function relating to operation of the machine for dictation purposes, a talking circuit coupling said recording machine to said switchboard apparatus in such a manner that said switchboard may be conditioned to establish a sound channel between any one of said remote dictator's stations and said machine, means responsive to pulses transmitted through said sound channel by said dial-operated switch and arranged to actuate said operating element in said machine when a predetermined number of dial impulses has been produced at said one dictator's station, a voice signal-responsive device coupled to said sound channel and arranged when energized by sound signals produced by said sound transducing apparatus to actuate said control means and thereby activate said drive means, a magnetic delay unit forming part of said sound channel for delaying the transmission of said sound signals to said machine recording head for a time duration sufficient to permit said drive means to reach proper operating speed before recording of said sound signals on said record commences, said unit including a rotating drum having a strip of magnetizable material secured to the periphery thereof, a magnetic recording head mounted adjacent said periphery and having an input circuit coupled to said talking circuit whereby said sound signals are converted to magnetic impressions on said strip, a magnetic pick-up head positioned adjacent said periphery at a point spaced away from said magnetic recording head, circuit means for coupling the output of said pick-up head to said machine recording head, and an erase head positioned adjacent said periphery to remove magnetic impressions from said strip after such impressions have passed by said pick-up head.

6. Dictation apparatus comprising, in combination, sound transducing apparatus, a dictating machine having a movable record and a sound recording head, said record and said head being arranged for relative travelling movement, motor drive means for producing said relative travelling movement, a speech delay unit having input and output circuits, a talking circuit coupling said input circuit to said sound transducing apparatus, means for coupling said output circuit to said machine recording head, said unit including a moving member receptive to and adapted to retain magnetic impressions, a magnetic recording head operable in response to signals transmitted through said talking circuit to said input circuit and positioned adjacent said magnetizable member to make magnetic impressions thereon in accordance with said signals, a magnetic pick-up head positioned adjacent said magnetizable member and adapted to develop signals in said output circuit in response to magnetic impressions on portions of said member passing thereby, said two magnetic heads being spaced apart along the path of movement of said member, the direction of movement of said member being from said magnetic recording head towards said pick-up head, and machine control means coupled to said talking circuit, said control means including means sensitive to voice signals produced by said sound transducing apparatus and adapted to actuate said motor drive means in response thereto.

7. Dictation apparatus comprising, in combination, sound transducing apparatus, a dictating machine having a movable record and a sound recording head, said record and said head being arranged for relative travelling movement, motor drive means for producing said relative travelling movement, a speech delay unit having input and output circuits, a talking circuit coupling said input circuit to said sound transducing apparatus, means for coupling said output circuit to said machine recording head, said unit including a moving member comprising an endless belt formed of magnetizable material receptive to and adapted to retain magnetic impressions, a magnetic recording head operable in response to signals transmitted through said talking circuit to said input circuit and positioned adjacent said belt to make magnetic impressions thereon in accordance with said signals, a magnetic pick-up head positioned adjacent said belt and adapted to develop signals in said output circuit in response to magnetic impressions on portions of said belt passing thereby, a magnetic erase head positioned adjacent said belt to remove magnetic impressions thereon, said three magnetic heads being spaced apart along the path of movement of said belt, the direction of movement of said belt being from said magnetic recording head, by said pick-up head and towards said erase head, and machine control means coupled to said talking circuit, said control means including means sensitive to voice signals produced by said sound transducing apparatus and adapted to actuate said motor drive means in response thereto.

8. Dictation apparatus comprising, in combination, sound transducing apparatus, a dictating machine having a movable record and a sound recording head, said record and said head being arranged for relative travelling movement, motor drive means for producing said relative travelling movement, a speech delay unit having input and output circuits, a talking circuit coupling said input circuit to said sound transducing apparatus, means for coupling said output circuit to said machine recording head, said unit including a rotating cylindrical member receptive to and adapted to retain magnetic impressions, a magnetic recording head operable in response to signals transmitted through said talking circuit to said input circuit and positioned adjacent the periphery of said member to make magnetic impressions thereon in accordance with said signals, a magnetic pick-up head positioned adjacent the periphery of said member and arranged to develop signals in said output circuit in response to magnetic impressions on portions of said member passing thereby, said two magnetic heads being spaced apart around the outer surface of said member, the direction of movement of said member being from said magnetic recording head towards said pick-up head so that the magnetic impressions produced by said magnetic recording head are sensed by said pick-up head after a predetermined time delay, and machine control means coupled to said talking circuit, said control means including means sensitive to voice signals produced by said sound transducing apparatus and adapted to actuate said motor drive means in response thereto.

9. A dictation system comprising, in combination, sound transducing apparatus, a dictating machine having a movable record and a sound recording head, said record and said head being arranged for relative travelling movement, motor drive means for producing said relative travelling movement, a talking circuit coupling said sound transducing apparatus to said machine, control means responsive to voice signals produced by said sound transducing apparatus in said talking circuit and arranged to actuate said motor drive means in response thereto, a speech delay unit for delaying the transmission of said voice signals to said machine recording head for a fixed time duration sufficient to permit said drive means to reach proper operating speed before recording on said record commences, said unit including a moving member receptive to and adapted to retain impulse impressions representative of said voice signals, an impulse recording head mounted adjacent said member and cooperating therewith to form impressions thereon in accordance with sound signals developed by said sound transducing apparatus, a sensing pick-up head also mounted adjacent said member at a point spaced from said impulse recording head for producing signals in accordance with the impressions formed in said member by said impulse recording head, means for moving said member at a substantially constant speed in a direction from said impulse recording head towards said sensing pick-up head, and circuit means for coupling the output of said pick-up head to said machine recording head.

10. A remote dictation system comprising, in combination, a plurality of remote dictator's stations each including sound transducing apparatus and an on-off switch, a centrally-located dictating machine having a movable record and a sound recording head, said record and said head being arranged for relative travelling movement, motor drive means for producing said relative travelling movement, a speech delay unit having input and output circuits, a sound channel for coupling said input circuit to any one of said remote dictator's stations when the on-off switch at said one station is actuated to its on position, said output circuit being coupled to said machine recording head, said delay unit including a moving member receptive to and adapted to retain magnetic impressions, a magnetic recording head positioned adjacent and in cooperative relation with respect to said magnetizable member, a magnetic pick-up head also positioned adjacent and in cooperative relation with respect to said magnetizable member, said two magnetic heads being spaced apart along the path of movement of said member, circuit means for coupling said magnetic recording head to said input circuit and for coupling said pick-up head to said output circuit, and machine control means coupled to said input circuit, said control means including means sensitive to voice signals in said sound channel and adapted to actuate said motor drive means in response thereto.

11. A remote dictation system comprising, in combination, a plurality of remote dictator's stations each including sound transducing apparatus and an on-off switch, a centrally-located dictating machine having a movable record and a sound recording head, said record and said head being arranged for relative travelling movement, motor drive means for producing said relative travelling movement, a speech delay unit having input and output circuits, a sound channel for coupling said input circuit to any one of said remote dictator's stations when the on-off switch at said one station is actuated to its on position, said output circuit being coupled to said machine recording head, said delay unit including a rotating drum having secured to its peripheral surface a strip of magnetizable material receptive to and adapted to retain magnetic impressions, a magnetic recording head positioned adjacent and in cooperative relation with respect to said strip, a magnetic pick-up head also positioned adjacent and in cooperative relation with respect to said strip at a point spaced around the periphery of said drum, circuit means for coupling said magnetic recording head to said input circuit and for coupling said pick-up head to said output circuit, and machine control means coupled to said input circuit, said control means including means sensitive to voice signals in said sound channel and adapted to actuate said motor drive means in response thereto.

12. A remote dictation system comprising, in combination, a plurality of remote dictator's stations each including sound transducing apparatus and a dial-operated switch, telephone switchboard apparatus including circuit means for connecting said dictator's stations to said switchboard apparatus, a centrally-located recording machine having a movable record, a recording head and a reproducing head, said heads and said record being arranged for relative travelling movement, drive means for producing said relative travelling movement, a talking circuit coupling said recording machine to said switchboard apparatus in such a manner that said switchboard may be conditioned to establish a sound channel between one of said remote dictator's stations and said machine, said machine also including an operating element arranged when actuated to condition said machine for playback operation to transmit signals from said reproducing head through said talking circuit to one of said dictator's stations, a speech delay unit to delay the transmission of sound signals from said sound transducing apparatus to said recording head, a voice signal-sensitive device coupled to said sound channel and arranged to activate said drive means in response to signals produced by said sound transducing apparatus, said device also being arranged to maintain said drive means activated when the machine is conditioned for playback operation and sound signals are being developed by said reproducing head, and control means coupled to said talking circuit, said control means being responsive to pulses produced by said dial-operated switch and arranged to actuate said operating element in said machine when a predetermined number of dial impulses has been produced at said one dictator's station.

13. A remote dictation system comprising, in combination, a plurality of remote dictator's stations each including sound transducing apparatus and a control device, a centrally-located recording machine having a movable record, a recording head and a reproducing head, said heads and said record being arranged for relative travelling movement, drive means for producing said relative travelling movement, a talking circuit for coupling any one of said dictator's stations to said recording machine, said machine also including an operating element arranged when actuated to condition said machine for playback operation to transmit signals from said reproducing head to one of said dictator's stations, said talking circuit including speech delay means for introducing a fixed delay time between production of sound signals at said dictator's stations and reception of said signals by said recording head, voice signal-sensitive means coupled to said talking circuit and arranged to activate said drive means in response to signals produced by said sound transducing apparatus, a controlling mechanism coupled to said talking circuit arranged to actuate said operating element and thereby condition said machine for playback in response to operation of said control device at one of said dictator's stations, and circuit means for coupling the output of said reproducing head to said voice-signal sensitive means when said machine is conditioned for playback operation whereby said drive means is maintained activated until all of the material recorded on said record has been played back.

14. A remote dictation system comprising, in combination, a plurality of remote dictator's stations each including sound transducing apparatus and a control device, a centrally-located recording machine having a movable record, a recording head and a reproducing head, said heads and said record being arranged for relative travelling movement, drive means for producing said relative travelling movement, a talking circuit for coupling any one of said dictator's stations to said recording machine, said machine also including an operating element arranged when actuated to condition said machine for playback operation to transmit signals from said reproducing head to one of said dictator's stations, said talking circuit including speech delay means for introducing a fixed delay time between production of sound signals at said dictator's stations and reception of said signals by said recording head, voice signal-sensitive means coupled to said talking circuit and arranged to activate said drive means in response to signals produced by said sound transducing apparatus, said signal-sensitive means being arranged to maintain said drive means activated after cessation of said sound signals for an additional period of time at least as long as the delay time introduced by said speech delay means, a controlling mechanism coupled to said talking circuit arranged to actuate said operating element and thereby condition said machine for playback in response to operation of said control device at one of said dictator's stations, means automatically operable to activate said drive means when said machine has been conditioned for playback operation, circuit means for coupling the output of said reproducing head to said voice signal-sensitive means when said machine is conditioned for playback operation whereby said drive means is maintained activated during the time playback signals are being developed by said reproducing head, and means operable when said machine is conditioned for playback operation to increase the additional period of time of activation of said drive means following the cessation of sound signals developed by said reproducing head, whereby said machine is maintained in playback condition until all of the material recorded on said record from one of said dictator's stations has been played back.

15. A remote dictation system comprising, in combination, a plurality of remote dictator's stations each including sound-transducing apparatus and a control device, a centrally-located recording machine having a movable record, a recording head and a reproducing head, said heads and said record being arranged for relative travelling movement, drive means for producing said relative travelling movement, a talking circuit for coupling any one of said dictator's stations to said recording machine, said machine also including an operating element arranged when actuated to condition said machine for playback operation to transmit signals from said reproducing head to one of said dictator's stations, said talking circuit including speech delay means for introducing a fixed delay time between production of sound signals at said dictator's stations and reception of said signals by said recording head, voice signal-sensitive means coupled to said talking circuit and arranged to activate said drive means in response to signals produced by said sound transducing apparatus, a controlling mechanism coupled to said talking circuit arranged to actuate said operating element and thereby condition said machine for playback in response to operation of said control device at one of said dictator's stations, drive control means automatically operable to activate said drive means when said machine has been conditioned for playback operation, circuit means for coupling the output of said reproducing head to said voice signal-sensitive means when said machine is conditioned for playback operation, and switch-over means for transferring control of said drive means from said drive control means to said voice signal-sensitive means as soon as playback signals are developed by said reproducing head, whereby said drive means is maintained activated until all of the material recorded on said record has been played back.

16. A remote dictation system comprising, in combination, a plurality of remote dictator's stations each including sound transducing apparatus and a control device, a centrally-located recording machine having a movable record, a recording head and a reproducing head, said heads and said record being arranged for relative travelling movement, drive means for producing said relative travelling movement, a talking circuit for coupling any one of said dictator's stations to said recording machine, said machine also including an operating element arranged when actuated to condition said machine for playback operation to transmit signals from said reproducing head to one of said dictator's stations, said talking circuit including speech delay means for introducing a fixed delay time between production of sound signals at said dictator's stations and reception of said signals by said recording head, voice signal-sensitive means coupled to said talking circuit and arranged to activate said drive means in response to signals produced by said sound transducing apparatus, a controlling mechanism coupled to said talking circuit arranged to actuate said operating element and thereby condition said machine for playback in response to operation of said control device at one of said dictator's stations, drive control means automatically operable to activate said drive means when said machine has been conditioned for playback operation, circuit means for coupling the output of said reproducing head to said voice signal-sensitive means when said machine is conditioned for playback operation, switchover means for transferring control of said drive means from said drive control means to said voice signal-sensitive means as soon as playback signals are developed by said reproducing head, whereby said drive means is maintained activated until all of the material recorded on said record has been played back, and switch-back means automatically operable if no signals are developed by said reproducing head for a predetermined time period after said machine has been conditioned for playback operation to deactuate said operating element and return said machine to condition for recording from one of said dictator's stations.

17. A remote dictation system comprising, in combination, a plurality of remote dictator's stations each including a control device and sound transducing apparatus, a centrally-located dictating machine having a movable record, recording and reproducing head means, said record and said head means being arranged for relative travelling movement, motor drive means for producing said movement, said machine also including an operating element arranged when actuated to condition said machine for playback operation, a talking circuit for coupling any one of said remote dictator's stations to said dictating machine, control means responsive to operation of said control device and arranged to actuate said operating element to condition said dictating machine for playback operation, means automatically operable to activate said drive means when said machine has been conditioned for playback operation, and sound signal-sensitive means coupled to said talking circuit while said machine is conditioned for playback operation and arranged upon cessation of playback signals from said record to deactuate said operating element.

18. A remote dictation system comprising, in combination, a plurality of remote dictator's stations each including a control device and sound transducing apparatus, a centrally-located dictating machine having a movable record, recording and reproducing head means, said record and said head means being arranged for relative travelling movement, motor drive means for producing said movement, said machine also including an operating element arranged when actuated to condition said machine for playback operation, a talking circuit for coupling any one of said remote dictator's stations to said dictating machine, control means responsive to operation of said control device and arranged to actuate said operating element to condition said dictating machine for playback operation, means automatically operable to activate said drive means when said machine has been conditioned for playback operation, and a sound signal-sensitive device coupled to said talking circuit while said machine is conditioned for playback operation and arranged after cessation of playback signals from said record to deactuate said operating element, said sensitive device including means adapted to maintain said operating element actuated for a short period of time immediately after cessation of said playback signals, said record having no speech gaps between the recorded portions thereof longer in time duration than said short period of time whereby all of the recorded material on said record will be played back before said operating element is deactuated.

19. A remote dictation system comprising, in combination, a plurality of remote dictator's stations each including a control device and sound transducing apparatus, a centrally-located dictating machine having a movable record, recording and reproducing head means, said record and said head means being arranged for relative travelling movement, motor drive means for producing said record motion and said relative movement, said machine also including an operating element arranged when actuated to condition said machine for playback operation, a talking circuit for coupling any one of said remote dictator's stations to said dictating machine, control means responsive to operation of said control device and arranged to actuate said operating element to condition said dictating machine for playback operation, means automatically operable to activate said drive means when said machine has been conditioned for playback operation to move said record at normal speed for producing intelligible sound signals from said reproducing head, and sound signal-sensitive means coupled to said talking circuit while said machine is conditioned for playback operation and arranged to deactuate said operating element upon cessation of the intelligible playback signals being transmitted from said record to one of said dictator's stations.

20. A remote dictation sysetm comprising, in combination, a plurality of remote dictator's stations each including an on-off switch, a sound transducing device and a dial-operated switch, telephone switchboard apparatus and circuit means for connecting said dictator's stations to said switchboard apparatus, a centrally-located dictating machine having a movable record, recording and reproducing head means, said record and said head means being arranged for relative travelling movement, motor drive means for producing said movement, said machine also including an operating element arranged when actuated to condition said machine for playback operation, a talking circuit connecting said dictating machine to said switchboard apparatus in such a manner that said switchboard is enabled to establish a sound channel connection between one of said remote dictator's stations and said dictating machine, control means responsive to pulses produced by said dial-operated switch and arranged to actuate said operating element to condition said dictating machine for playback operation when a predetermined number of dial impulses has been produced at said one dictator's station, and sound impulse-sensitive means coupled to said talking circuit while said machine is conditioned for playback operation and arranged upon cessation of playback signals from said record to deactuate said operating element.

21. Dictation equipment comprising, in combination, sound transducing apparatus, a dictating machine having a movable record and a sound recording head, said record and said head being arranged for relative travelling movement, motor drive means for producing said relative travelling movement, a talking circuit coupling said sound transducing apparatus to said machine, control means responsive to voice signals produced by said sound transducing apparatus in said talking circuit and arranged to actuate said motor drive means in response thereto, a speech delay unit for delaying the transmission of said voice signals to said machine recording head for a fixed time duration sufficient to permit said drive means to reach proper operating speed before recording on said record commences, said unit including a moving member receptive to and adapted to retain impulse impressions representative of said voice signals, an impulse recording head mounted adjacent said member and cooperating therewith to form impressions thereon in accordance with sound signals developed by said sound transducing apparatus, a sensing pick-up head also mounted adjacent said member at a point spaced from said impulse recording head for producing signals in accordance with the impressions formed in said member by said impulse recording head, means for moving said member at a substantially constant speed in a direction from said impulse recording head towards said sensing pick-up head, said speed of movement and the spacing between said impulse head and said pick-up head being proportioned such that said fixed time duration is at least 25 milliseconds, and circuit means for coupling the output of said pick-up head to said machine recording head.

22. Dictation apparatus comprising, in combination, sound transducing apparatus, a dictating machine having a movable record and a sound recording head, said record and said head being arranged for relative travelling movement, motor drive means for producing said relative travelling movement, a speech delay unit having input and output circuits and arranged to introduce a fixed time lag between production of sound signals by said sound transducing apparatus and the reception of said signals by said recording head, a talking circuit coupling said input circuit to said sound transducing apparatus, means for coupling said output circuit to said machine recording head, said unit including a moving member receptive to and adapted to retain magnetic impressions, a magnetic recording head operable in response to signals transmitted through said talking circuit to said input circuit and positioned adjacent said magnetizable member to make magnetic impressions thereon in accordance with said signals, a magnetic pick-up head positioned adjacent said magnetizable member and adapted to develop signals in said output circuit in response to magnetic impressions on portions of said member passing thereby, said two magnetic heads being spaced apart along the path of movement of said member, the direction of movement of said member being from said magnetic recording head toward said pick-up head, machine control means coupled to said talking circuit comprising voice signal-sensitive means arranged to actuate said motor drive means in response to sound signals produced by said transducing apparatus, an amplifier forming part of said voice signal-sensitive means to intensify sound signals coupled thereto from said talking circuit, relay means operable by the output of said amplifier means when said output reaches a predetermined level of intensity and arranged when so operated to actuate said motor drive means, and circuit means responsive to the amplitude of said sound signals and arranged to increase the amount of amplification when said amplitude exceeds a predetermined threshold level, whereby said voice-signal-sensitive means is relatively insensitive to background noises adjacent said sound transducing apparatus.

References Cited in the file of this patent

UNITED STATES PATENTS 2,200,351 Whitehead ............ May 14, 1940